United States Patent [19]

Shinozaki et al.

[11] 3,934,266

[45] Jan. 20, 1976

[54] DARK CURRENT CORRECTION CIRCUIT IN TWO-TUBE COLOR TELEVISION CAMERA

[75] Inventors: Takashi Shinozaki, Yokohama; Seigo Kokufukata, Tokyo, both of Japan

[73] Assignee: Victor Company of Japan, Limited, Yohohama, Japan

[22] Filed: Dec. 26, 1974

[21] Appl. No.: 536,654

[30] Foreign Application Priority Data

Dec. 28, 1973 Japan.................................... 49-133

[52] U.S. Cl. ............. 358/44; 178/DIG. 26; 358/41
[51] Int. Cl.².......................................... H04N 9/07
[58] Field of Search........................ 358/41, 43, 44; 178/DIG. 26, 7.2

[56] References Cited
UNITED STATES PATENTS 3,558,809  1/1971  Aoki............................ 178/DIG. 26
3,814,849  6/1974  Bucher et al. ....................... 178/7.2

*Primary Examiner*—George H. Libman

[57] ABSTRACT

A dark current correction circuit in a two-tube color camera having first and second camera tubes respectively for chrominance signals and luminance signals comprises a circuit for applying to the first camera tube a target voltage in accordance with temperature variation in the image pickup surface thereof, a circuit provided in the picked-up output signal system of the first camera tube and operating to compensate or cancel a dark current component within the picked-up output signal, a circuit for applying to the second camera tube a target voltage in accordance with temperature variation in the image pickup surface thereof, and a circuit for mixing with the picked-up output luminance signal of the second camera tube a horizontal blanking pulse at a level in accordance with the temperature variation in the image pickup surface of that camera tube. The level controlled horizontal blanking pulse, upon being applied to the picked-up output luminance signal, effects correction of a dark current variation component within the luminance signal due to temperature variation in the image pickup surface of the camera tube and for a dark current variation component due to variation of the target voltage.

5 Claims, 1 Drawing Figure

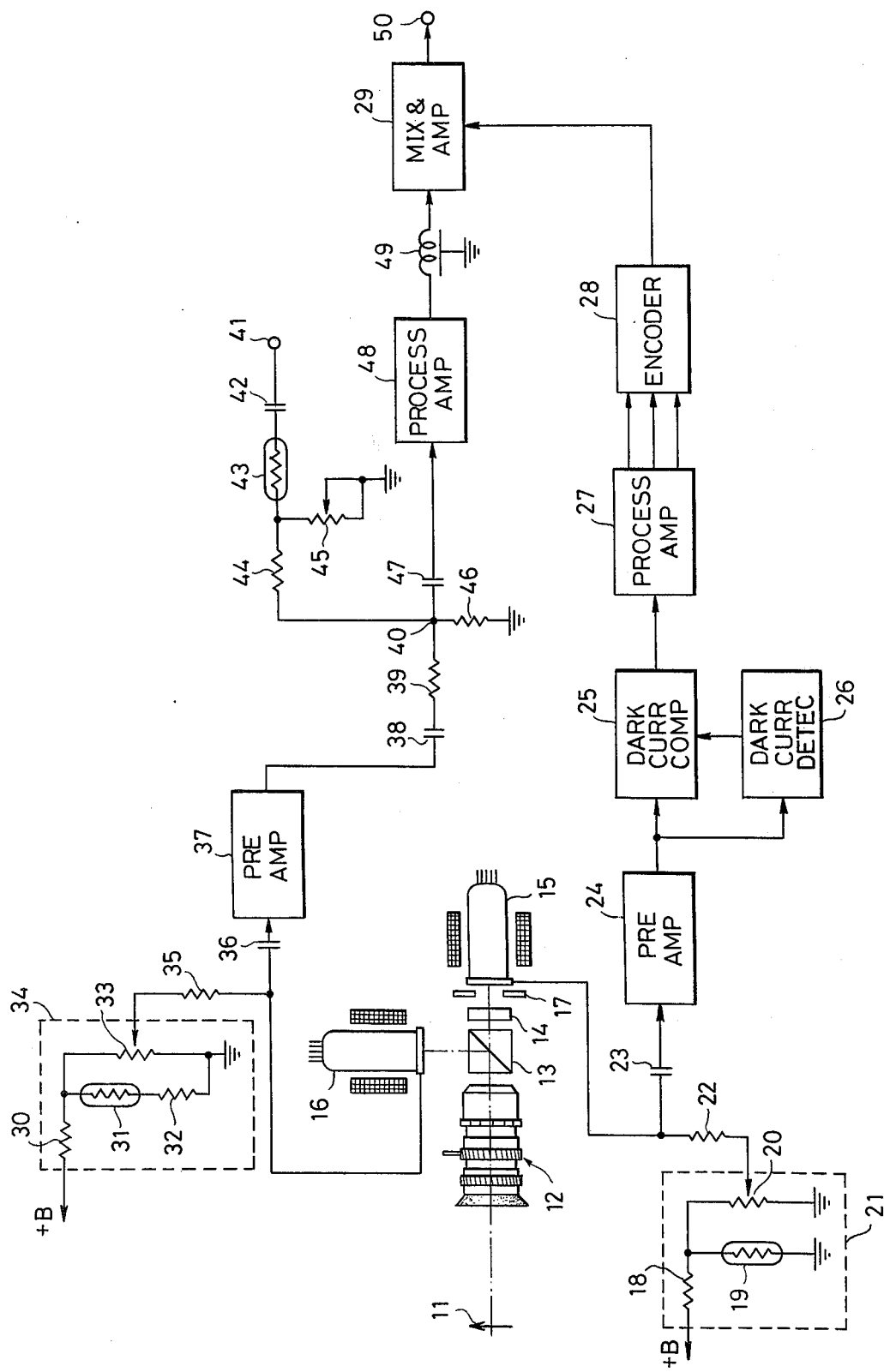

DARK CURRENT CORRECTION CIRCUIT IN TWO-TUBE COLOR TELEVISION CAMERA

BACKGROUND OF THE INVENTION

This invention relates generally to a dark current correction circuit in a two-tube type color television camera. More particularly, the invention relates to a dark current correction circuit which, in a color television camera of two-tube type having a camera tube for chrominance signals and a camera tube for luminance signals, eliminates the effect of dark current variations due to temperature variations due to temperature variations of the two camera tubes.

In general, camera tubes of the vidicon class such as vidicons, Plumbicons, and Newbicons, are accompanied by the problems of much dark current and large variation of dark current occurring particularly when there are temperature variations.

In a color television camera, if the setup (black level as a reference) of a chrominance signal fluctuates, the white balance will be disturbed, and therefore it is necessary to prevent such fluctuation of the setup. When there is a temperature variation, the dark current of the camera tube also varies, and for this reason, the setup fluctuates. Accordingly, for the purpose of substantially preventing variation of the setup even when the dark current of the camera tube varies, a dark current detection circuit and dark current compensation circuit have heretofore been used.

In such a circuit organization, a masking plate is placed at one part of the image pickup surface of the camera tube, and the dark current variation is compensated or corrected for by subjecting the signal of that part corresponding to this plate (that is, the dark current part) to sampling by the dark current detection circuit and subjecting this to subtraction with the image pickup output signal by means of the dark current compensation circuit.

In the case of a monochrome (black-and-white) television camera, the problem of the above described adverse effect due to fluctuation of the setup does not arise, but in a color television camera, the above described countermeasure becomes necessary. In the case of a two-tube type color camera, it is necessary to provide the above mentioned dark current detection circuit and dark current compensation circuit in the signal system of the camera tube for chrominance signals. For this reason, there arises the necessity of setting the black level also with respect to the signals of the camera tube for luminance signals.

Accordingly, the solution would seem to be the provision of a dark current detection circuit, a dark current compensation circuit, etc., similar to those of the chrominance signal system, also for the signal system of the camera tube for luminance signals. This measure, however, would give rise to a complication of the circuit organization and an increase in the cost of production of the camera.

On one hand, when there is a temperature rise in the image pickup surface of a camera tube, the dark current increases over the entire image pickup surface, and, at the same time the static shading (that is, a condition wherein the dark current is not uniform over the entire image pickup surface but is large particularly in the end parts) increases. For this reason, the dark current detection circuit detects also the resulting increase in this shading, whereby an accurate dark current correction cannot be carried out. Accordingly, as one countermeasure, the target voltage of the camera tube is lowered at the time of a temperature rise thereby to suppress the increase in the dark current, and, at the same time, to suppress the increase in the shading.

In a two-tube color camera, however, if the above mentioned target voltage control is carried out in only the camera tube for chrominance signals, there will arise the problem of difference between the sensitivities of the two camera tubes for chrominance signals and for luminance signals.

SUMMARY OF THE INVENTION

Accordingly, it is a general object of the present invention to provide a novel and useful dark current correction circuit in a two-tube color television camera in which the above described difficulties and problems have been overcome.

A specific object of the invention is to provide a dark current correction circuit in a two-tube color camera having a camera tube for luminance signals and a camera tube for chrominance signals, which dark current correction system, while having a dark current detection circuit and a dark current compensation circuit in the chrominance signals system of the camera, is provided in the luminance signal system with a dark current correction circuit of a novel and simple circuit organization which does not rely on the conventional dark current detection circuit and dark current compensation circuit.

Another object of the invention is to provide a dark current correction circuit in a two-tube color camera which system is capable of correcting dark current variation accompanying variation of temperature of the camera tubes and, moreover, is capable of equalizing the sensitivities of the camera tube for chrominance signals and the camera tube for luminance signals.

Further objects and features of the invention will be apparent from the following detailed description when read in conjunction with the accompanying drawing.

BRIEF DESCRIPTION OF THE DRAWING

In the drawing, the single FIGURE is a block diagram showing the essential organization of one embodiment of a dark current correction circuit according to the present invention in a two-tube color television camera.

DETAILED DESCRIPTION

In the circuit illustrated in the FIGURE, light from an object 11 to be picked up by the camera passes through a camera lens system 12 and a half mirror (or prism) for optical path division. One portion of the light thus divided passes through a stripe filter 14 and reaches the image pickup surface of a camera tube 15 for chrominance signals, while the remainder portion of the light is projected on the image pickup surface of a camera tube 16 for luminance signals. A masking plate 17 for dark current detection is provided at the front face of the pickup surface of the camera tube 15.

A target voltage is supplied by way of a resistor 22 to the target of the camera tube 15 for chrominance signals from a target voltage supply circuit 21 comprising a resistor 18, a thermistor 19, and a variable resistor 20. The thermistor 19 is a heat-sensitive resistance element of which resistance value varies greatly with variation in temperature, and which is provided in the vicinity of the face plate of the camera tube 15, for example, at a position between the half mirror 13 and the stripe filter 14 which will not cause interference with the optical path. This thermistor 19 is connected in parallel with the variable resistor 20 and varies its resistance value in accordance with temperature variation in the vicinity of the face plate of the camera tube 15, whereby the target voltage impressed on the target of the camera tube 15 is accordingly controlled. The variable resistor 20 is provided for adjusting and setting the target voltage.

The target voltage supplied by the target voltage supply circuit 21 varies in accordance with temperature variation as mentioned above. For example, when the temperature rises, the target voltage is lowered, and the sensitivity of the camera tube is lowered thereby to suppress increase in the dark current and, at the same time, to suppress increase of static shading.

The resulting picked-up output signal from the camera tube 15 for chrominance signals is supplied by way of a capacitor 23 to a pre-amplifier 24, where it is amplified, and thereafter the amplified signal is fed to a dark current compensation circuit 25 and a dark current detection circuit 26. The dark current detection circuit 26 operates according to blanking pulses to effect sampling of a signal of that part corresponding to the masking plate 17 of the picked-up output signal (that is, the dark current component) and to supply this dark current signal to the dark current compensation circuit 25. The dark current compensation circuit 25 applies this sampled dark current signal with reversed polarity to the picked-up output signal from the pre-amplifier 24 and thereby carries out compensation (cancellation) or correction for the dark current component.

As a result of the above described target voltage control by the thermistor 19 and dark current compensation by the dark current compensation circuit 25, the resulting signal is rendered into a picked-up signal without fluctuation of the black level due to temperature variation. This picked-up signal of stabilized black level is separated by a process amplifier 27 into three signals of red (R), green (G), and blue (B), which are subjected by an encoder 28 to a specific signal processing and rendered into a normal chrominance signal, which is supplied to a mixing and output amplifier 29.

In a two-tube color camera, the ratio of apportioning of the quantities of light respectively to the camera tube 16 for luminance signals and the camera tube 15 for chrominance signals is not limited to 1:1 in all cases, and, because the target settings differ, the values of the dark currents of the camera tubes differ depending on this light quantity apportioning ratio. For this reason, an independent control circuit for canceling the dark current variation component (setup variation component) becomes necessary for each of the camera tube for luminance signals and the camera tube for chrominance signals.

A target voltage is supplied by way of a resistor 35 to the target of the camera tube 16 for luminance signals from a target voltage supply circuit 34 comprising a resistor 30, a thermistor 31, a resistor 32, and a variable resistor 33. The thermistor 31 is provided in the vicinity of the face plate of the camera tube 16, for example, at a position between the half mirror 13 and the face plate at which it will not obstruct the optical path. The thermistor 31 varies its resistance value in accordance with variation of the temperature in the vicinity of the face plate of the camera tube 16, and the target voltage supplied by the target voltage supply circuit 34 to the target of the camera tube 16 is accordingly controlled.

Here, as a result of the variation of the target voltage of the camera tube 15 for chrominance signals by the target voltage supply circuit 21 in accordance with temperature variation, a difference occurs between the sensitivities of the camera tube 15 and the camera tube 16 for luminance signals. Accordingly, the sensitivity of the camera tube 16 is varied in accordance with temperature variation so that it becomes equal to the sensitivity of the camera tube 15 by means of the above mentioned target voltage supply circuit 34. The variable resistor 33 is used for the purpose of adjusting and setting the target voltage. The thermistor 31 is connected in parallel with the variable resistor 33.

The picked-up output signal produced by the camera tube 16 for luminance signals is supplied by way of a capacitor 36 to a pre-amplifier 37, where it is amplified and is thereafter passed through a capacitor 38 and a resistor 39 to a point 40.

Here, the luminance signal sent from the camera tube 16 and reaching the point 40 contains a dark current variation component arising from a variation of temperature of the face plate (image pickup surface) of the camera tube 16 and a dark current variation component arising from a variation of the target voltage due to the above mentioned thermistor 31.

On the other hand, a horizontal blanking pulse of inverse polarity supplied through an input terminal 41 is conducted by way of a capacitor 42, a thermistor 43, and a resistor 44 to the point 40. This thermistor 43 is provided together with the above mentioned thermistor 31 in the vicinity of the face plate of the camera tube 16 and, furthermore, is connected in series with the capacitor 42 and the resistor 44 between the input terminal 41 and the point 40. The resistance value of the thermistor 43 varies with temperature variation of the pickup surface of the camera tube 16, and the level of the horizontal blanking pulse varies. A variable resistor 45 is connected between ground and the junction between the thermistor 43 and the resistor 44 for the purpose of adjusting and setting the level of the horizontal blanking pulse.

The three thermistors 19, 31, and 43 are all installed in mutually close proximity in the same atmosphere and detect the same temperature variations.

At the point 40, the horizontal blanking pulse of which level has been varied in accordance with temperature variation as described above is mixed in an AC manner with the luminance signal from the pre-amplifier 37. As a result, the dark current variation component accompanying temperature variation of the pickup surface of the camera tube 16 and the dark current component due to variation in the target voltage as described above are simultaneously corrected. Therefore, the luminance signal passing through the point 40 becomes a luminance signal of fixed black level without setup fluctuation. In other words, the variation of the resistance of the thermistor 43 due to its temperature variation, the resistance values of resistors 44, 45, and 46, and other values are so selected that the two dark current variation components are both corrected.

This luminance signal is supplied by way of a capacitor 47 to a process amplifier 48, where it is subjected to a specific process and is thereafter passed through a delay line 49 for matching with the time delay of the chrominance signal in the aforementioned process amplifier 27 and the encoder 28. The resulting signal thus delayed by a specific time is then fed to the mixing and output amplifier 29.

In this mixing and output amplifier 29, the above mentioned luminance signal and the chrominance signal from the encoder 28 are mixed and rendered into a color television signal, which is then led out through an output terminal 50.

Further, this invention is not limited to these embodiments but various variations and modifications may be made without departing from the scope and spirit of the invention.

What is claimed is:

1. In a two-tube color television camera having a first camera tube for chrominance signals and a second camera tube for luminance signals respectively producing chrominance and luminance signals as picked-up outputs upon receiving respective divided portions of incident light from an object to be image-picked up, a dark current correction circuit comprising:
   a detection circuit provided in an output picked-up signal system of said first camera tube and operating to detect a dark current component from said output picked-up signal;
   a compensation circuit provided in said output pickup signal system and operating to correct said dark current component in accordance with an output signal of said detection circuit;
   a mixing circuit provided in an output picked-up luminance signal system of said second camera tube and operating to apply to said output picked-up luminance signal a horizontal blanking signal with inverse polarity and to mix the two signals; and
   a first heat-sensitive resistance element which is provided in the vicinity of the face plate of said second camera tube and connected to a signal system for applying said horizontal blanking signal and operates to vary the resistance value thereof in accordance with temperature variation of the image pickup surface of said second camera tube and to vary the level of said horizontal blanking signal, said first heat-sensitive resistance element being so adapted and connected as to operate in accordance with the resistance variation thereof to correct the dark current variation component in accordance with said temperature variation and to fix the black level of said output picked-up luminance signal.

2. A dark-current correction circuit as claimed in claim 1 which further comprises:
   a first target voltage applying circuit for applying a target voltage to the target of said first camera tube;
   a second heat-sensitive resistance element which is provided in the vicinity of the face plate of said first camera tube and connected within said first target voltage applying circuit and operates to vary the resistance value thereof in accordance with temperature variation of the image pickup surface of said first camera tube and thereby to control said target voltage in a manner to lower said target voltage when said temperature rises;
   a second target voltage applying circuit for applying a target voltage to the target of said second camera tube; and
   a third heat-sensitive resistance element which is provided in the vicinity of the face plate of said second camera tube and connected within said second target voltage applying circuit and operates to vary the resistance value thereof in accordance with temperature variation of the image pickup surface of said second camera tube and thereby to cause the sensitivity of said second camera tube to vary in correspondence with the variation of sensitivity of said first camera tube due to variation in the target voltage thereof.

3. A dark current correction circuit as claimed in claim 1 in which said mixing circuit has an input terminal for application thereto of a horizontal blanking signal, a capacitor connected to said input terminal, and a junction point connect to said output picked-up luminance signal system in a manner to apply said horizontal blanking signal to said output picked-up luminance signal, and said first heat-sensitive resistance element is connected in series with said capacitor between said input terminal and said junction point.

4. A dark current correction circuit as claimed in claim 2 in which the temperature-resistance value characteristic of said first heat-sensitive resistance element is so selected that said element operates to compensate for a dark current variation component in accordance with the temperature variation in the image pickup surface of said second camera tube and, at the same time, to correct also a dark current variation arising from a variation in the target voltage of said second camera tube.

5. A dark current correction circuit as claimed in claim 2 in which said first target voltage applying circuit has a first variable resistor connected in parallel with said second heat-sensitive resistance element, and said second target voltage applying circuit has a second variable resistor connected in parallel with said third heat-sensitive resistance element.

* * * * *